United States Patent [19]

Canteloup

[11] Patent Number: 4,676,644
[45] Date of Patent: Jun. 30, 1987

[54] DEVICE FOR MONITORING THE THICKNESS OF THIN LAYERS

[75] Inventor: Jean Canteloup, Montlhery, France

[73] Assignee: Compagnie Industrielle des Telecommunications, Paris, France

[21] Appl. No.: 673,075

[22] Filed: Nov. 19, 1984

[30] Foreign Application Priority Data

Nov. 21, 1983 [FR] France .............................. 83 18486

[51] Int. Cl.$^4$ .............................................. G01B 4/02
[52] U.S. Cl. .................................... 356/351; 156/626; 356/357
[58] Field of Search ....................... 356/357, 351, 382; 156/626

[56] References Cited

U.S. PATENT DOCUMENTS 4,367,044  1/1983  Booth, Jr. et al. .................. 356/357

OTHER PUBLICATIONS

Bennett et al., "SElective and Directional Etching of Polysilicon and WSi$_2$", IBM Tech. Disclos. Bull., vol. 25, No. 1, pp. 33–34, 6/82.

Primary Examiner—Davis L. Willis
Assistant Examiner—Matthew W. Koren

Attorney, Agent, or Firm—Sughrue, Mion, Zinn, Macpeak, and Seas

[57] ABSTRACT

A device for monitoring the thickness of a low absorption thin film or layer (53B) on an at least partially reflecting substrate (31) placed inside a vacuum chamber (1) closed by a window (7), includes a polarized laser source (8), a polarizing cube (13), placed in the path of the laser beam, consisting of two right-angle prisms (13A, 13B) assembled by their hypotenuse faces by means of a dielectric film (13C), the cube being oriented so that the incident laser beam has a 45 degree angle of incidence with the film, the cube allowing a first part of the incident beam to pass into a first, linear optoelectronic converter (15A) supplying a first electrical signal ($I_{oe}$), the cube reflecting a second part of the incident beam to pass through a quarter-wave plate (7, 7A) and reflect off the layer before returning through the cube, without being deflected, and thereafter striking a second converter (15B) supplying a second electrical signal ($I_e$). The device further includes apparatus for finding the ratio of the second electrical signal to the second electrical signal, for correcting spurious light, or obtaining the derivative of the ratio, for calibrating the measuring head, and for supplying a signal when the derivative has remained, for a given amount of time, between two given values limiting a set point value for the desired thickness of the layer.

6 Claims, 2 Drawing Figures

DEVICE FOR MONITORING THE THICKNESS OF THIN LAYERS

FIELD OF THE INVENTION

This invention concerns an optoelectronic device for monitoring the thickness of a thin film or layer during an etching or deposition process.

BACKGROUND OF THE INVENTION

In patent document FR-A 82 14034, an electronic head was described which comprised a laser source, a beam expander and a beam splitter consisting of a parallel-sided semi-reflecting mirror, disposed at a 45° angle to the expanded beam.

This provides a reflected beam, sent to a reference photocell, and a transmitted beam which is directed to a measuring photocell after reflecting off the sample thin layer and again reflecting off the splitter.

Such a device presents the disadvantage of utilizing only a fraction of the light emitted by the laser source, only half of the laser light being transmitted through the mirror and only half of the beam reflected from the layer being reflected toward the measuring cell, so that only a quarter of the light emitter by the laser is utilized for measurement purposes.

One object of the present invention is to provide a device using virtually all of the light emitted by the laser, thus increasing the sensitivity of the device.

Another object of the invention is to combine two devices of the type just described, in order to provide a two-station thin layer thickness measuring device.

SUMMARY OF THE INVENTION

The invention provides a device for monitoring the thickness of a low-absorption thin layer on an at least partially reflecting substrate, placed in a vacuum chamber closed with a window, and including all of the following features:
a polarized laser source,
a polarizing cube placed in the path of the laser beam, consisting of two right angle prisms assembled by their hypotenuse faces by means of a dielectric film, said cube being oriented so that the incident laser beam has an angle of incidence of 45° with said film, said cube allowing a first part of the incident beam to pass into a first, linear optoelectronic converter delivering a first electrical signal, said cube reflecting a second part of the incident beam which goes through a quarter-wave plate, is reflected by the layer, and then passes again through the cube without being deflected to be directed to a second optoelectronic converter supplying a second electrical signal proportional to the luminuous flux received thereby,
means for finding the ratio of the second electrical signal over the first said signal,
means for compensating the spurious light,
means for obtaining the derivative of said ratio,
means for supplying a signal when said derivative has remained, for a given amount of time, between two given values being the limits of a set point for the desired layer thickness.

Advantageously, said quarter-wave plate is the window plate itself.

Furthermore, an optical calibrator is placed beneath said chamber window to render the unit photometric.

Yet another object of the invention is to provide a device for simultaneously monitoring two thin layers, each disposed on a stand placed inside an enclosure, said device wherein the following features are provided:
a polarized laser, with, in the path of the laser beam, a parallel-sided plate with sides oriented to 45°, a polarizing cube made of two right-angle prisms assembled by their hypotenuse faces by means of a dielectric film, said cube being oriented so that the laster beam strikes said film at an incident angle of 45°, and a first linear optoelectronic converter supplying a first electrical signal, the first thin layer being disposed in the path of the beam reflected by the plate, a second converter being disposed in the path of the beam reflected by said first layer and supplying a second electrical signal, the second thin layer being disposed in the path of the beam reflected by the cube, with a quarter-wave plate therebetween, a third converter being disposed in the path of the beam reflected by the second layer and supplying a third electrical signal,
means for finding the ratios of the second and third signals to the first signal,
means for finding the derivatives of said ratios
and means for supplying a signal when either of said derivatives has remained, for a given time, between two values bounding the set point value for the desired thickness of the corresponding layer.

Advantageously, at least one of the quarter-wave plates is a plate of a chamber window.

The invention will be more readily understood in reading the description hereafter of two devices according to the invention for monitoring the thickness of thin layers.

DESCRIPTION OF THE PREFERRED EMBODIMENTS

Figure 1:
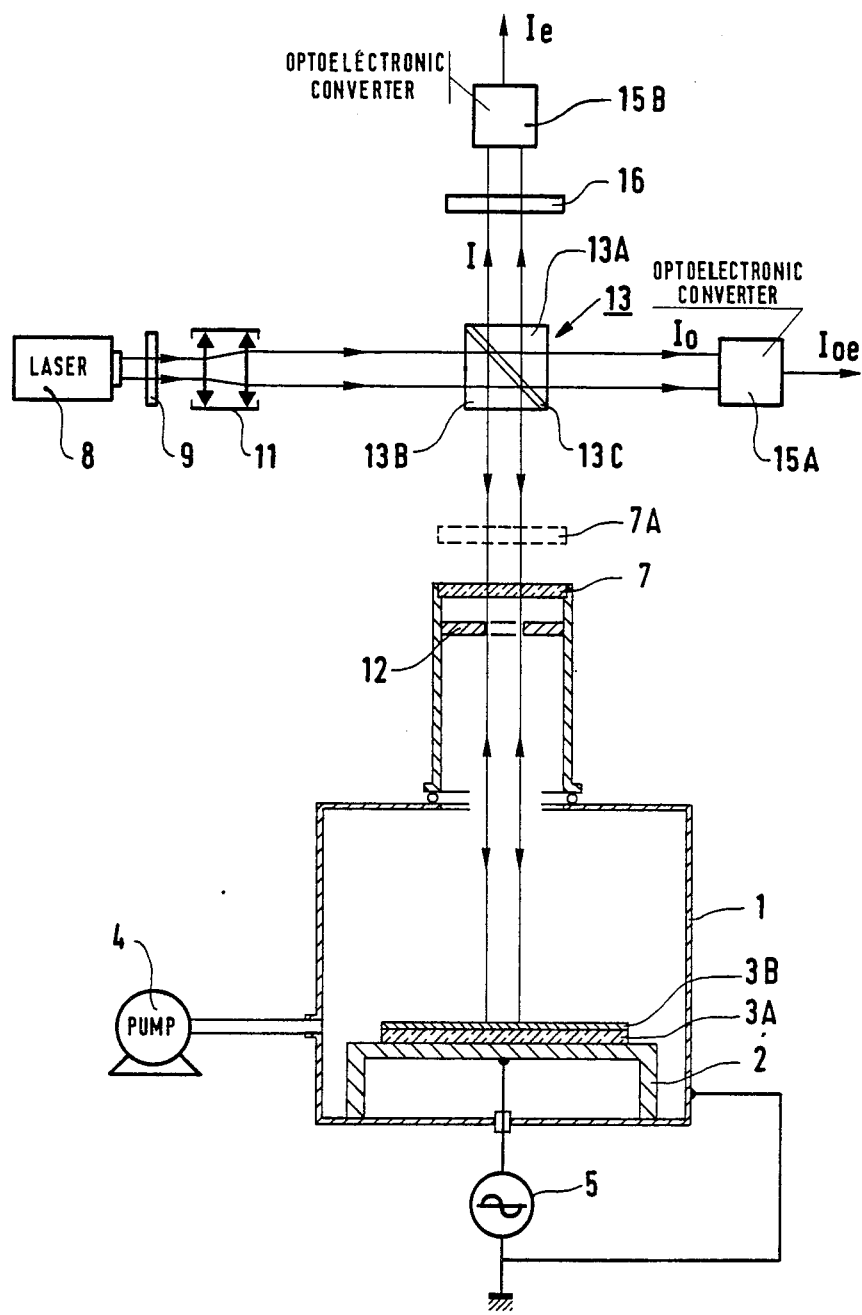
FIG. 1 illustrates a thin layer thickness monitoring device.

Referring first to FIG. 1, item 1 is a chamber containing the part to be etched, placed on a stand 2, said part comprising a substrate 3A and a layer 3B. A high frequency generator 5 sets up a plasma-generating voltage between the stand 2 and the wall of the chamber (or alternatively between the stand and an electrode). The chamber is provided with a window 7. A pump unit 4 provides a suitable vacuum inside the chamber.

A monochromatic light source 8, such as a helium-neon laser, emits a light beam. If the laser source does not provide a polarized light, a polarizer 9 is placed in the path of the light beam. The width of the beam is adjusted by an optical expander 11.

A polarization cube 13, consisting of two right angle prisms 13A and 13B joined by their hypotenuse faces by means of a dielectric film 13C, is placed in the incident beam such that the angle of incidence with the film 13C equals 45°.

In this way, approximately 98% of the beam is reflected towards the layer 3B, with the remaining 2% going through the cube, to an optoelectronic converter 15A which supplies an electrical signal $I_{oe}$.

The reflected beam is directed to layer 3B after going through window 7. The latter window is advantageously a quarter-wave plate. If such is not the case, a quarter-wave plate 7A is inserted between the window 7 and the cube 13.

The beam reflected by layer 3B goes back through the cube and with virtually no losses strikes a second linear optoelectronic converter 15B, which supplies an electrical signal $I_e$.

Linear optoelectronic converters 15A and 15B are preferably photoconductive or photovoltaic diodes.

Letting $I_o$ and $I$ be the intensities of the light beams striking converters 15A and 15B, these intensities are converted to proportional electrical signals $I_{oe}$ and $I_e$.

It is already known, in particular from document FR-A 82 9434, how to use these signals to obtain an end-of-etching signal. It needs only to be remembered here that this is accomplished by setting up the ratio $I_e/I_{oe}$ (after suitable filtering and amplification, as required), then finding the derivative $D = d(I_e/I_{oe})/dt$.

In one mode of utilization, the value of signal D is compared with two values and when D stays within these two values for a given amount of time (for example for 7 to 8 seconds), it means that the layer to be etched away has been completely etched.

With the help of the polarizing cube, the device's sensitivity can be augmented by a factor of slightly less than 4.

The sensitivity can be easily adjusted by placing an adjustable polarizer 16 in the path of the beam striking converter 15B. The device is calibrated by means of a calibrator 12 placed beneath the window.

Figure 2:
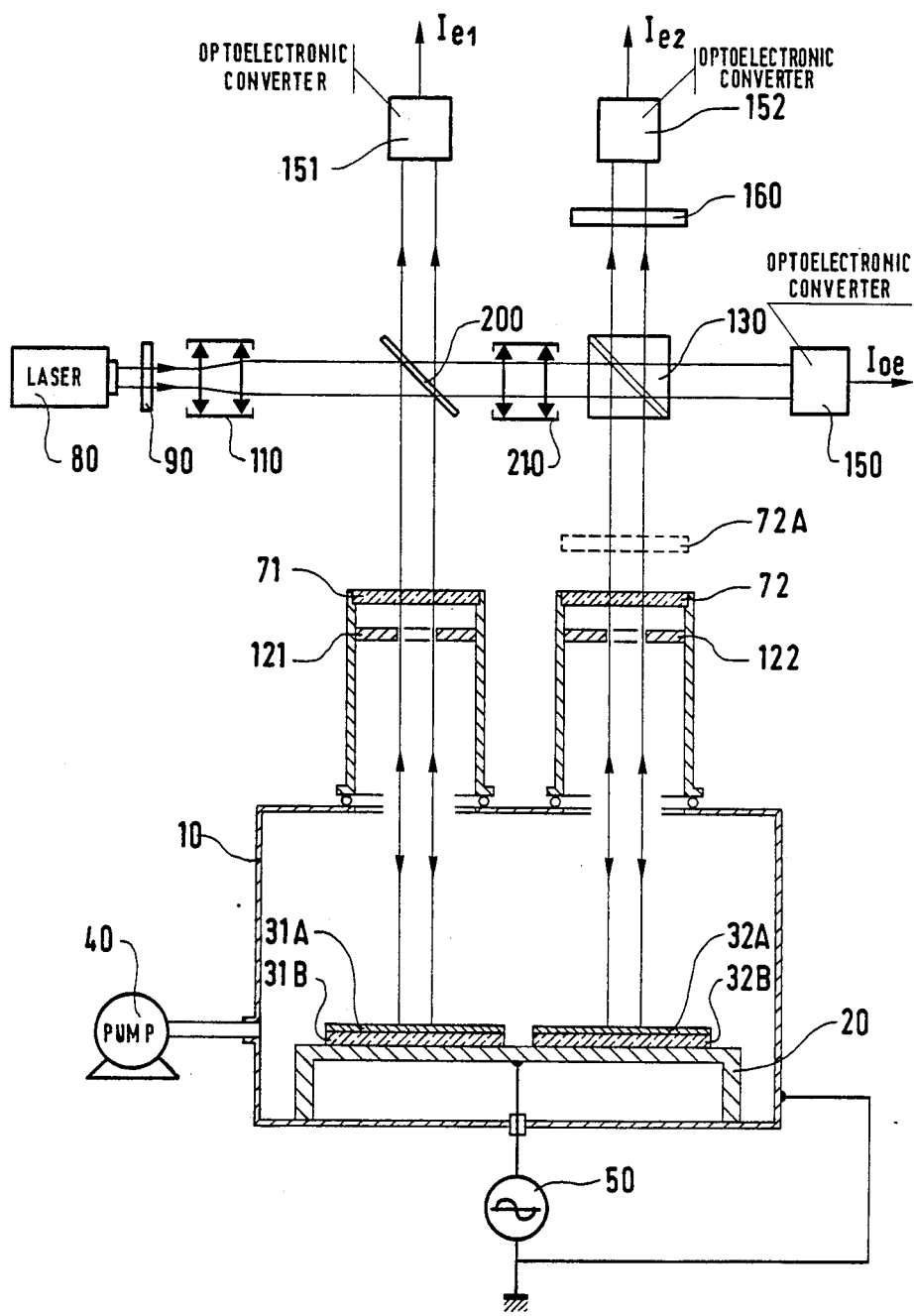
FIG. 2 illustrates a device for simultaneously monitoring the thickness of two thin layers.

FIG. 2 shows a device making it possible to monitor the thicknesses of two layers simultaneously, using a single laser source.

Two layers 31A and 32A and their respective substrates 31B and 32B are disposed on a stand 20 which is placed into a vacuum chamber 10 having two windows 70 and 71. A pump unit 40 provides a suitable vacuum in the chamber; a generator 50 sets up the voltage required to create the plasma.

A laser 80, associated with an expander 110 and, optionally, a polarizer 90, directs a beam onto a parallel-sided plate 200 aligned with a polarizing cube 130.

The laser beam is partly reflected to layer 31A and after reflecting thereon, the light again goes through plate 200 and strikes an optoelectronic converter 151 which emits a signal $I_{e1}$. The part of the beam which passed through plate 200 without deflecting reaches the cube 130 which passes part of it to an optoelectronic converter 150 (signal $I_{oe}$) and reflects another part of it to layer 32A, said latter part thereafter reflecting to another optoelectronic converter 152 (signal $I_{e2}$).

Window 72 is a quarter-wave plate. Altenatively, a quarter-wave plate 72A can be inserted in the beam path.

The intensity of the beam striking converter 152 can be adjusted with a variable polarizer 160.

Signals $I_{oe}$, $I_{e1}$, and $I_{e2}$ are electrically processed as previously indicated.

The device just described enables simultaneous processing of two layers, using a single laser and a single plasma chamber, with the same sensitivity as is available from the prior art.

A lengthener (an afocal reducer or expander) 210, which may be adjustable or not, can be disposed between the plate 200 and the cube 130 to facilitate intensity adjustments of the light beams.

Calibrators 121, 122 placed near the windows also serve to calibrate luminous intensities.

The invention finds application in the field of electronic circuits manufacturing.

What is claimed is:

1. Device for monitoring the thickness of a thin layer having a low absorptin rate, said layer being disposed on a substrate placed in a vacuum chamber closed by a window which layer is at least partially reflecting, said device comprising:
    a polarized laser source creating a plane polarized beam,
    a polarizing cube placed in the path of the laser beam, said cube consisting of two right angle prisms having hypotenuse faces and being assembled by their hypotenuse faces with a dielectric film interposed therebetween, said cube being oriented so that the incident beam has an angle of incidence of 45 degrees with said dielectric film said incident beam defining with the normal to said dielectric film an incidence plane, and having a polarization plane perpendicular to said incidence plane, a first linear opto-electronic converter oriented relative to said cube for causing a first part of the incident beam to pass into said first, linear optoelectronic converter for delivering a first electrical signal, said cube reflecting a second part of the incident beam onto said layer within said vacuum chamber such that the second part of said incident beam is reflected from said layer, a quarter-wave plate in the path of said second part of said incident beam reflected by the layer which then passes again through the cube without being deflected, a second optoelectronic converter positioned in the path of said reflected second part of said incident beam for supplying a second electrical signal proportional to the luminous flux received thereby,
    means for finding the ratio of the second electrical signal to the first said signal,
    means for compensating any spurious light,
    means for finding the derivative of said ratio,
    and means for supplying a signal when said derivative has remained, for a given amount of time, between two given values being the limits of a set point from the desired layer thickness.

2. Device according to claim 1, wherein said quarter-wave plate comprises the window plate of said chamber.

3. The device according to claim 2, wherein a polarizer is inserted in the light path between said cube and said second converter.

4. The device according to claim 1, wherein a polarizer is inserted in the light path between said cube and said second converter.

5. Device for monitoring a first (31A) and a second (32A) thin layer simultaneously with said layers each being disposed respectively on a substrate (31B, 32B) being at least partially reflecting and being placed inside a vacuum chamber (10) closed by first and second windows, said device comprising
    a polarized laser source (80) emitting a plane polarized laser beam for impingement on said layers, and a parallel-sided plate (200) oriented at a 45 degree angle and a polarizing cube (130) consisting of two right-angle prisms having hypotenuse faces, said parallel sided plate (200) and said polarizing cube (130) being sequentially positioned in the path of said laser beam, a dielectric film assembling said prisms by their hypotenuse faces, said cube being oriented so that said laser beam strikes said film at an incident angle of 45 degrees, the polarization plane of said beam being perpendicular to its incidence plane, said parallel-sided plate partially reflecting said laser beam into a first beam which is via said first window, reflected by said first layer and after having crossed said parallel-sided plate and being received by a first opto-electronic converter (151) providing a first electric signal (Ie1), said cube 130 partially reflecting said laser beam into a second beam which is via said second window, reflected on said second layer, a quarter wave plate (72) positioned between said cube and said second layer and said second beam after having crossed said cube being partially received by a second opto-electronic converter (152) providing a second electrical signal (Ie2), and a third opto-electronic converter (150) receiving a part of said laser beam transmitted through said cube and providing a third electrical signal (ioe), means for finding the ratios of said first and second signals to said third signal, means for finding the derivatives of said ratios, and means for supplying a signal when either of said derivatives has remained, for a given amount of time, between two values bounding the set point value for the desired thickness of the corresponding layer.

6. Device according to claim 5, wherein said second window passed through by said beam reflected by said cube consists of said quarter-wave plate.

* * * * *